United States Patent

[11] 3,549,060

[72] Inventor Jerry G. Smylie
 Los Banos, Calif.
[21] Appl. No. 768,247
[22] Filed Oct. 17, 1968
[45] Patented Dec. 22, 1970
[73] Assignee Avoset Company
 Oakland, Calif.
 a corporation of Delaware

[54] DISPENSING VALVE FOR A PRESSURIZED DISPENSING CONTAINER
 2 Claims, 4 Drawing Figs.
[52] U.S. Cl. ..................................................... 222/513,
 222/521
[51] Int. Cl. ..................................................... B67d 3/00
[50] Field of Search ........................................ 222/402.11,
 394, 515, 516, 549, 525, 499, 512, 521, 402.14,
 513

[56] References Cited
UNITED STATES PATENTS
1,742,605 1/1930 Lemoine ..................... 222/521X

| | | | |
|---|---|---|---|
| 2,073,193 | 3/1937 | Curran ......................... | 222/521 |
| 2,591,465 | 4/1952 | Popoff ......................... | 222/553X |
| 3,131,836 | 5/1964 | Van Baarn .................... | 222/521 |

Primary Examiner—Stanley H. Tollberg
Attorney—Busser, Smith & Harding

ABSTRACT: A pressurized dispensing container has an open end which is closed by a dispensing valve assembly having a tubular member communicating with the interior of the container and having a conical closed outer end. A cap having a bore therethrough is threadedly connected to a portion of the exterior of the tubular member spaced below the conical outer end and receiving the conical outer end. The tubular member has a side opening intermediate the threaded connection and the conical outer end thereof and the bore of the cap has a reduced inner diameter portion adjacent the conical outer end of the tubular member and adapted to seat on the conical outer end. In one embodiment the cap is spring biased to the closed position.

INVENTOR
JERRY G. SMYLIE
BY Buser Smith & Hardy
ATTORNEYS

INVENTOR
JERRY G. SMYLIE

BY Bisser Smith & Hardy

ATTORNEYS

DISPENSING VALVE FOR A PRESSURIZED DISPENSING CONTAINER

BACKGROUND OF THE INVENTION

Generally in pressurized dispensing containers such as aerosol containers flow rates cannot be finely adjusted since the rate of dispensing is subject to finger tension or pressure. Further, flow rates are low and a substantial amount of product can be entrapped beyond the seal point to harden and spoil. These problems are solved by this invention.

SUMMARY OF THE INVENTION

A pressurized dispensing container has a dispensing valve provided with a tubular member communicating with the interior of the container and having a conical closed outer end exterior of the container. A cap having a bore therethrough is threadedly connected to a portion of the exterior of the tubular member spaced below the conical outer end thereof. The tubular member has a side opening intermediate the threaded connection and the outer end of the tubular member. The bore of the cap has a reduced inner diameter portion adjacent to and adapted to seat on the conical outer end of the tubular member. The cap may be automatically returned to the closed position by spring means.

PREFERRED EMBODIMENTS

Figure 1:
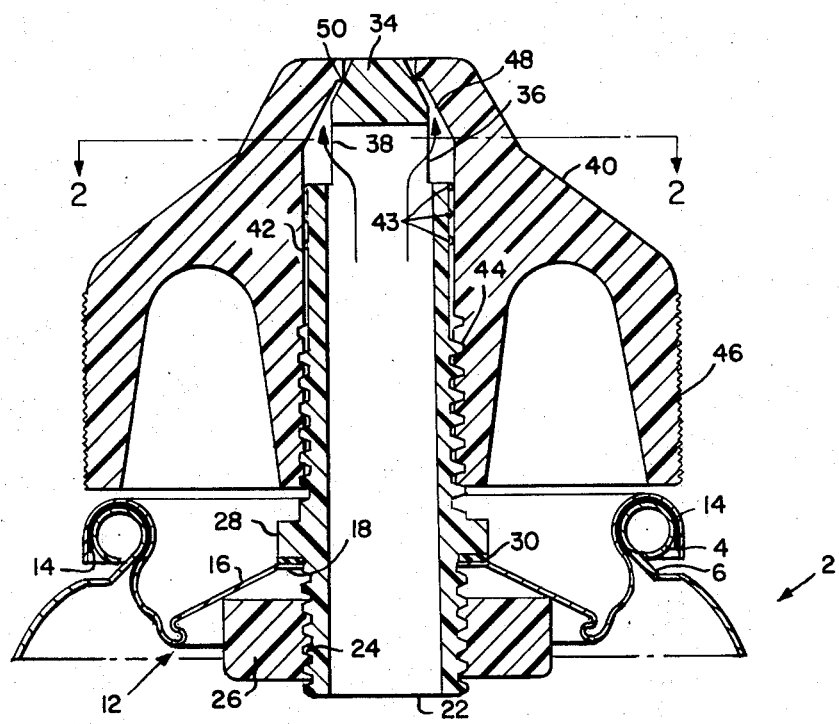
FIG. 1 is a vertical section partially broken away through a pressurized dispensing container having a dispensing valve in accordance with the invention.

A conventional metal pressurized dispensing container 2 has an open upper end defined by a peripheral beaded portion 4, at the end of a generally conical portion 6. A metal plug 12 closes the upper end of container 2 and is inserted under pressure to conform generally to bead 4. A gasket 14 is interposed between beaded portion 4 and plug 12. Plug 12 has a transverse portion 16 with a central opening 18 which receives a tubular member 22 communicating with the interior of container 2. The lower end of member 22 is threaded as indicated at 24 and carries a hexagonal nut 26 which bears against the transverse portion 16 of plug 12 so as to urge peripheral flange 28 on member 22 downwardly to force it against gasket 30 interposed between flange 28 and transverse portion 16 and thus form a tight seal between member 22 and plug 12.

Tubular member 22 extends exterior of container 2 and has a conically shaped closed outer end 34. Adjacent end 34 are a pair of side openings 36 and 38 in member 22.

A cap 40 having a central bore 42 passing entirely through it is threadedly connected at 44 to member 22. Member 22 has peripheral beads 43 to effect a seal between cap 40 and member 22.

The outer periphery of cap 40 is knurled as indicated at 46 to facilitate turning the cap. Cap 40 has an inner conically shaped portion 48 which is spaced away from outer end 34 of tubular member 22 and a reduced inner diameter portion 50 which is adapted to seat on outer end 34 of member 22. Advantageously, as shown, the reduced diameter portion 50 will have a relatively sharp edge for seating on the outer end 34.

OPERATION

In operation, the pressure within the can 2 forces the contained fluid outwardly through tube 22, through openings 36 and 38 and between outer end 34 and the inner periphery of cap 40 until it is topped by the reduced inner diameter portion 50 bearing against outer end 34. When the cap is unscrewed the contained fluid is permitted to flow between reduced inner diameter portion 50 and outer end 34. With the cap 40 unscrewed to provide a desired rate of flow, the rate of flow will remain constant. Further, the design is susceptible to providing large rates of flow. In addition, the user will readily become accustomed to the rates of flow achieved with different positions of the cap 40 and hence will be able to readily repeat the desired rate of flow.

Figure 3:
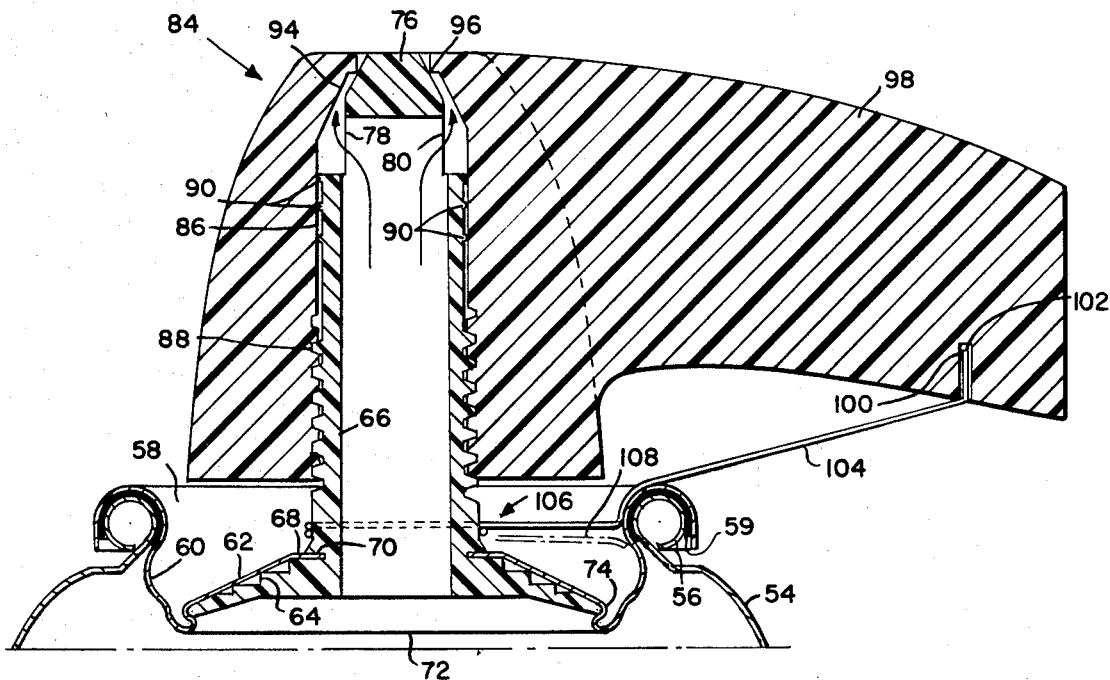
FIG. 3 is a vertical section partially broken away through a pressurized dispensing container having a spring biased dispensing valve in accordance with the invention.

Referring to FIG. 3, a conventional metal pressurized dispensing container 54 has an upper open end defined by a beaded portion 56. A metal plug 58 closes the upper end of container 54 and is inserted under pressure to conform generally to bead 56 preferably with a gasket 59 there between as shown in FIG. 3.

Plug 58 has a depending portion 60 and an inwardly extending portion 62 which overlies a stepped base 64 of a plastic tube 66. Portion 62 has an inner peripheral flange 68 engaged in a peripheral slot 70 in tube 66. The outer periphery 72 of base 64 is retained in curved portion 74 of plug 58.

Tubular member 66 extends exterior of container 54 and has a conically shaped closed outer end 76. Adjacent end 76 are a pair of side openings 78 and 80 in member 66.

A cap 84 having a circular bore 86 passing entirely therethrough is threadedly connected as indicated at 88 to tubular member 66. Tubular member 66 has a plurality of peripheral beads 90 which engage cap 84 and effect a seal between the cap and the tubular member.

Cap 84 has an inner conically shaped portion 94 which is spaced away from outer end 76 of tubular member 66 and a reduced inner diameter portion 96 which is adapted to seat on outer end 76 of tubular member 66. Advantageously, as shown, the reduced diameter portion 96 will have a relatively sharp edge for seating on the outer end 76.

Cap 84 has a handle portion 98 having an opening 100 for the reception of an end 102 of an arm 104 of a torsion spring 106 which is loosely coiled about tubular member 66. The other arm 108 of torsion spring 106 abuts against plug 58 which acts as a stop for arm 108. Torsion spring 106 acts to bias cap 84 to the closed position.

OPERATION

Figure 2:
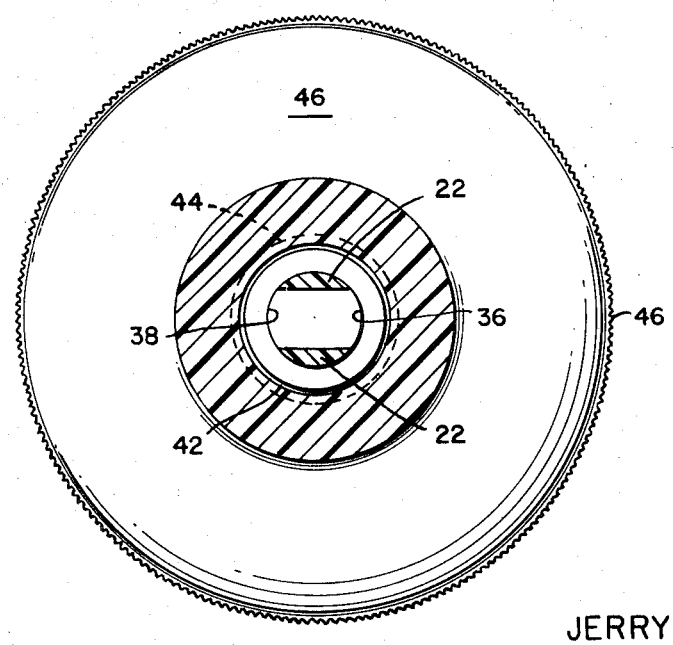
FIG. 2 is a horizontal section taken on a plane indicated by the line 2–2 in FIG. 1.
Figure 4:
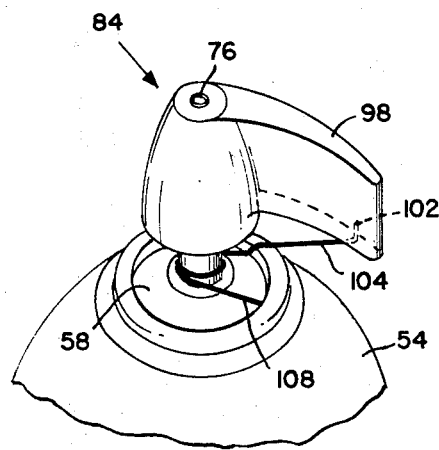
FIG. 4 is a top perspective view, partially broken away of the container of FIG. 3.

It will be evident that the operation of the embodiment shown in FIGS. 3 and 4 and as described above is identical with the operation of the embodiment of FIGS. 1 and 2 with the sole exception that cap 84 is unscrewed by being moved by handle 98 against the force of spring 106 and when handle 98 is released spring 106 will return cap 84 to the closed position.

All of the above described parts may be of metal, but preferably will be of plastic where indicated in the drawings. Exemplary plastics are polystyrene, polypropylene, medium to high density polyethylene (0.926—0.965), ethylene vinyl acetate and acrylonitrite butadiene styrene. A superior seal is achieved when one of either the cap or the tubular member are formed of a resilient plastic to affect a seal when forced against the other more rigid part.

It will be understood that the above described embodiments are by way of illustration and are not intended to be limiting.

I claim:

1. In combination with a pressurized dispensing container a dispensing valve comprising:
    a tubular member having an open inner end communicating with the interior of the container and having a conical closed outer end exterior of the container;
    a cap having a bore therethrough threadedly connected to a portion of the exterior of the tubular member spaced below the conical outer end and receiving the conical outer end of the tubular member;
    the tubular member having a side opening intermediate the threaded connection and the conical outer end of the tubular member;

said bore of the cap having a reduced inner diameter portion adjacent said outer end having a diameter intermediate the maximum and minimum diameter of said outer end and adapted to seat on the conical outer end of the tubular member, said reduced inner diameter portion presenting a sharp edge for seating on the conical outer end of the tubular member, and one of the cap and the tubular member being more resilient than the other, spring means to bias the cap to the closed position; and means for securing the tubular member to the container.

2. The combination of claim 1 in which the cap and tubular member are of plastic.